Dec. 9, 1947.  C. S. SELTZER  2,432,490
TUBULAR BODY MAKER AND CONVEYOR
Filed Oct. 30, 1944  2 Sheets-Sheet 1

Inventor
CLIFFORD S. SELTZER
By Francis J. Klempay
Attorney

Dec. 9, 1947. C. S. SELTZER 2,432,490
TUBULAR BODY MAKER AND CONVEYOR
Filed Oct. 30, 1944 2 Sheets-Sheet 2
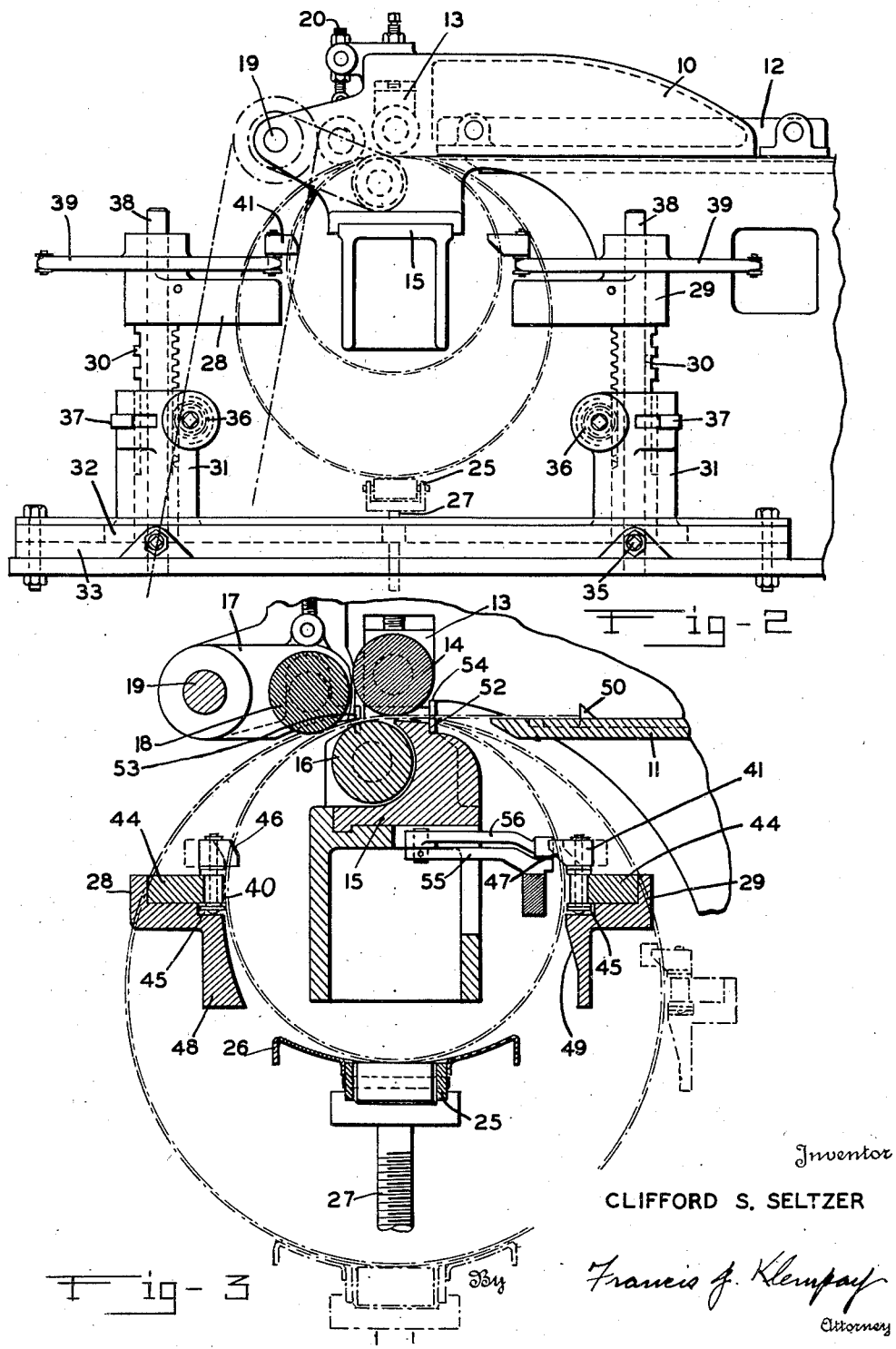
Inventor
CLIFFORD S. SELTZER Patented Dec. 9, 1947

2,432,490

UNITED STATES PATENT OFFICE 2,432,490

TUBULAR BODY MAKER AND CONVEYOR

Clifford S. Seltzer, Warren, Ohio, assignor to The Taylor-Winfield Corporation, Warren, Ohio, a corporation of Ohio Application October 30, 1944, Serial No. 561,013

1 Claim. (Cl. 153—54)

This invention relates to tubular body making and conveying and more particularly to improved conveying apparatus adapted to be incorporated in a tubular metallic body member of the roll bending type for transporting the tubular bodies away from the body maker immediately upon completion. The features of the invention are of particular applicability in automatic high-speed metallic container making machines and thus one of the more advantageous uses of the principles of the invention is the transporting, in such apparatus, of the formed bodies from the forming station to the welding station.

The primary object of the invention is the provision of improved apparatus for removing formed metallic tubular bodies from a forming station or device which is rapid and efficient in operation, simple in construction, and which does not require the use of reciprocating parts which heretofore has been the prime source of difficulty in the continued and uninterrupted operation of apparatus of the general nature involved. The problems encountered in designing, constructing and maintaining in operation body transfer mechanism of the reciprocating type are particularly acute in apparatus intended for high-speed operation and these problems are overcome by the present invention in that apparatus constructed in accordance with the same is simple, efficient and without limitation as to its speed of operation.

A further object of the invention is the provision of an improved tubular body transporting apparatus capable of receiving the bodies directly from a body maker and otherwise having the characteristics outlined above which is readily adjustable to handle bodies of different diameters whereby the range of usefulness of the combined apparatus is increased. Another object of the invention is the provision of an efficient mechanical device for taking the formed bodies from a tubular body maker in continuous but spaced progression for delivery to and movement through a welding station which may be positioned adjacent the body maker, such movement being of a smooth, and uniform character whereby more consistent welding results are attained in the successive pieces being fabricated. Thus, the conveying apparatus of the present invention is well suited for removing the formed tubular bodies from a body maker for delivery to an electric resistance welding station of the kind disclosed and claimed in my co-pending application Serial No. 554,324, filed September 15, 1944. The welding station end of the conveying apparatus illustrated herein is illustrated in said co-pending application.

The above and other specific objects and advantages of the invention will become apparent upon consideration of the following detailed specification and the accompanying drawing wherein there is disclosed a preferred embodiment of the invention.

In the drawing:

Figure 2 is an end view of the apparatus of Figure 1; and

Figure 3 is a transverse section through a portion of the apparatus of Figure 1, the view being taken along the line 3—3 of Figure 1.

Figure 1:
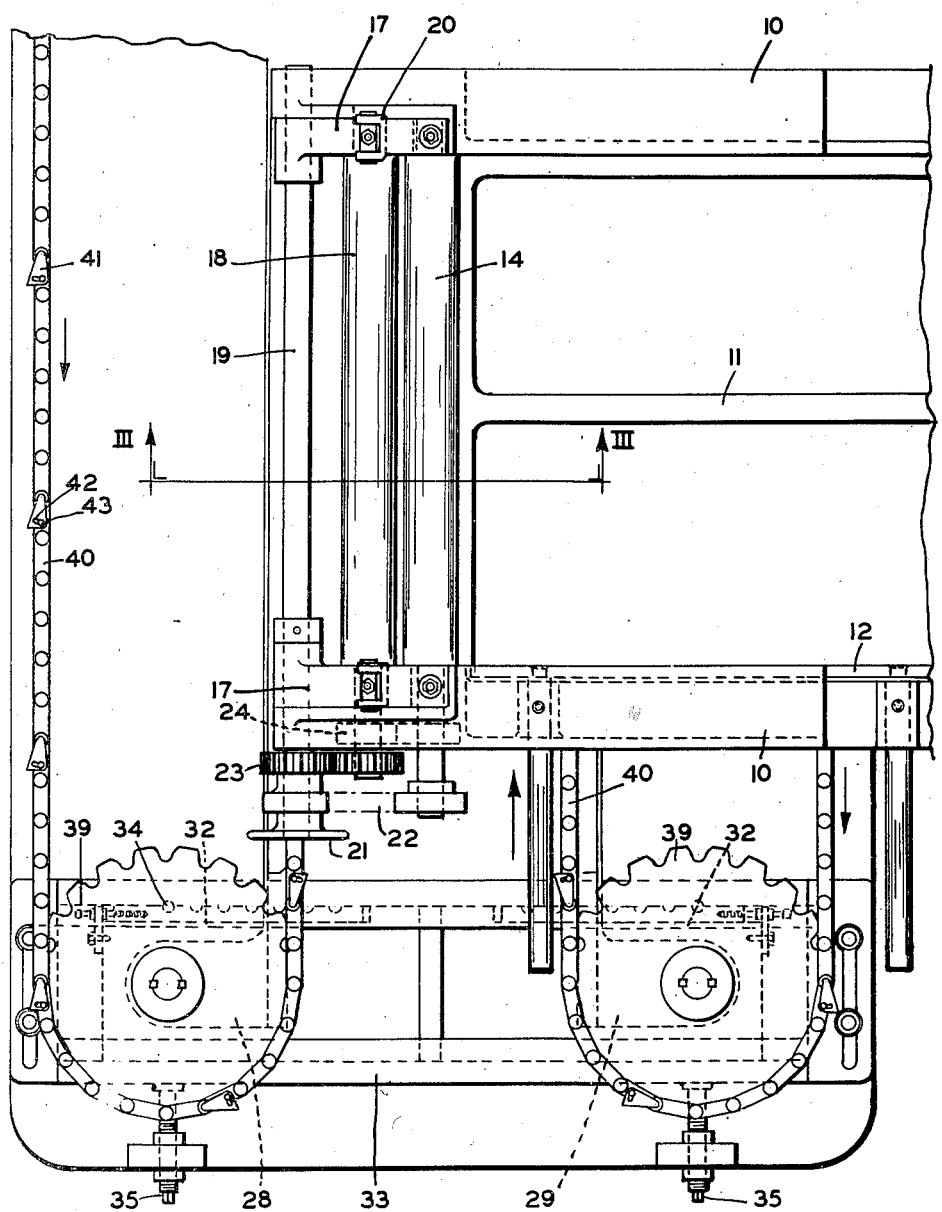
Figure 1 is a plan view of a combined body maker and body conveying apparatus constructed in accordance with the principles of the invention.

Referring to the drawing, reference numeral 10 represents an overhanging frame portion of a combined machine and such frame portion is, in accordance with usual practice, provided with a flat surface 11 for the slideable support of the flat metallic stock blanks to be formed into tubular bodies by the body maker. An adjustable side guide 12 is provided to constrain the side edges of the blanks thus providing for the accurate alignment of the blanks preparatory to their entrance into the roll bending pass of the apparatus regardless of the width of the blanks being processed. Journaled in chocks 13 adjustably mounted in windows formed in spaced sections of the frame portion 10 is a roll 14 and journaled in a horn 15 supported below the frame portion 10 is a cooperating roll 16. Journaled in the free ends of pivotally mounted arms 17 is a third roll 18 which, in conjunction with the rolls 14 and 16, provides a pyramidal roll bender which, as is well known in the art, forms a curvature in the stock passing through it to a degree determined by the adjustment of the relative positions of the rolls. Arms 17 are pivotally mounted on a shaft 19 and the position of their free ends is determined by adjustment of eye-bolts 20 which are anchored in lugs extending from the spaced sections of the frame portion 10. A drive sprocket 21 is keyed to shaft 19 and roll 16 is driven from this shaft by a chain 22. Gears 23 interconnect shaft 19 and roll 18 and gears 24 interconnect rolls 18 and 14 so that all the rolls on the bender are driven in unison.

Extending longitudinally below the horn 15 and substantially in vertical alignment with the roll 14 is a roller conveyor 25 having longitudinally spaced and concaved guide elements 26 secured thereto. Roller conveyor 25 is supported on vertically adjustable posts 27 to provide an adjustment for different diameters of bodies. Extending along either side of the horn 15 and in parallel relation with the longitudinal axis thereof are the longitudinally extending rails 28 and 29 each of which is supported on a pair of longitudinally spaced posts 30. In the drawing herein but one post of each pair is illustrated, it being obvious that the opposite end of the conveyor structure is substantially a duplicate of the body maker end of such structure as specifically illustrated herein. Posts 30 are vertically slideable in pedestals 31 which in turn extend upwardly from slide blocks 32. As indicated in Figures 1 and 3 blocks 32 are slideable transversely of the longitudinal axis of the horn 15 in a sub-base 33, lock pins 34 being provided to lock the blocks 32 in adjusted position. Base 33 is adjustable longitudinally by means of the screws 35. Posts 30 are adjustable vertically by means of rack gears formed integral therewith and meshing with pinion gears 36 journaled in the pedestals 31. Locking keys 37 fitted in the pedestals 31 and cooperating with slots formed in the posts 30 hold the latter in adjusted position and assists in arriving at the proper horizontal alignment of the bars 28 and 29 as will be understood.

Extending longitudinally through the posts 30 are the shafts 38 to which are keyed horizontally disposed sprocket wheels 39 which rest on upwardly extending bosses formed on the bars 28 and 29. Entrained over the sprockets 39 are the endless link chains 40 certain pins of which, at predetermined spaced intervals, are elongated vertically to swivably mount dogs 41. These dogs are wedge-shaped in horizontal plan as shown and are each provided with a slot 42 to receive a small pin 43 extending upwardly from a link of the chain 40 whereby the pivotal movement of the dog is limited. The range of movement lies between a position wherein the entire body of the dog is outwardly of the inner edge of the inner reaches of the chains as shown in dotted line in Figure 3 and a position wherein the leading normal end surface of the dog projects considerably inward of such inner edges as shown in full lines in Figure 3. Chains 40 are driven in the directions indicated by the sprockets, not shown, at the opposite end of the conveyor structure as shown in said co-pending application and the action of centrifugal force as the dogs round sprockets 32 will move the dogs to outer operative position as shown in Figure 1. However, if desired, suitable additional finger means may be employed to insure such operative positioning of the dogs preparatory to their engaging the bodies formed by the rolls 14, 16 and 18.

Referring to Figure 3 rails 28 and 29 carry backing bars 44 the inner side edges of which are engaged by the rollers of the chains 40 and are each provided with recesses 45 to receive the lower side links of the chains. The dogs 41 which are associated with the rail 28 have their inner side edges beveled upwardly and outwardly as shown at 46 in Figure 3 while the dogs 41 on the opposite side of the machine have their inner side edges beveled downwardly and outwardly as shown at 47. Further, rail 28 is provided with an integral guiding surface 48 which directs the advancing edge of the stock issuing from the roll pass onto the guide 26 while the rail 29 is provided with an inwardly directing guide surface 49 for directing such leading edge past the adjacent reach of the chain 40 associated with the rail 29.

The flat sheets are fed to the rolls 14, 16 and 18 in properly timed sequence by a retractable reciprocating dog 50 which advances the sheet over the support 11 and into the pass between the rolls and which is operated by suitable clutch-controlled driving mechanism, not shown. As the sheets issue from the bending rolls their leading edges first engage the bevel surfaces 46 of those dogs 41 on the left side of the machine which are in the path of movement of the sheets. The leading edges advance past the guides 48, 26 and 49 and similarly engage the bevel surfaces 47 of those dogs 41 on the right side of the machine which are in the path of travel of the stock. The leading edges then advance to a surface 52 formed on the horn and by this time the trailing edges of the sheets will have passed, circumferentially, a guide bar 53 which, of course, is positioned longitudinally beyond the circumferential path of movement of the sheets. Thus the flat stock is formed into open seamed tubular bodies and the speed of rotation of the bending rolls as well as the movement of the feeding dog 50 is so synchronized with respect to the speeds of travel of the conveyor chains 40 and their instantaneous related positions that immediately upon a body being formed in the manner outlined above two of the dogs 41 on the chains 40 will engage the following edge of the body to propel the same along the conveyor 25 and outwardly of the forming station and into the welding station or other apparatus with which the mechanism of the present invention is associated. Parallel with the gauge bar 53 is a second gauge bar 54 in longitudinal alignment with the surface 52 and immediately upon the leading end of a body leaving the forming station the edges of the open seam of the body will engage the outer surfaces of the bars 53 and 54 to hold the seam open and maintain the proper orientation of the body. Pivotally mounted on a longitudinally adjustable supporting bar 55 which extends longitudinally into the horn 15 is a trip lever 56 which is engaged by one of the dogs 41 bearing against the trailing end of a body to thereby operate the lever 56 which, through suitable devices not shown, initiates operation of the feeding dog 50 with respect to the next succeeding stock piece. In this manner the feeding of the successive stock pieces to the forming station is synchronized with respect to the instantaneous position of the preceding formed body thereby preventing any interference between successive stock pieces and insuring the full completion of the forming of the bodies before the trailing ends of the bodies are engaged by any of the dogs 41.

In practice, the drive for the two chains 40 is so adjusted and maintained that a propelling dog 41 on one of the chains is always exactly transversely opposite one of the propelling dogs on the other of the chains so that the trailing ends of the formed bodies is simultaneously engaged at diametrically opposite points thereby preventing canting of the bodies at the start of and during the movement away from the forming station. To accommodate bodies of larger diameter the conveyor 25 is, of course, moved downwardly and the bars 28 and 29 are moved outwardly and downwardly, all as indicated in Figure 3 of the drawing.

It should now be apparent that I have provided an improved tubular body maker and an improved body conveying apparatus for use in conjunction with the body maker which accomplish the objects initially set out. The apparatus is simple in design, readily constructable, and is capable of operating in a smooth, rapid and reliable manner with a minimum of adjustment and other maintenance requirements. The absence of reciprocating parts in the mechanism for removing the bodies from the body maker enables such mechanism to be of lighter construction while yet of ample strength and durability for performing this essential function. Vibration and wear is substantially less and in the case of a combined machine employing a resistance seam welding unit in conjunction with the body maker the bodies are moved by the same conveying means through the welding station in a uniform and uninterrupted manner which is advantageous in that better consistency can be attained in the quality and continuity of the welds.

The above specifically described embodiment of the invention should be considered as illustrative only as obviously many changes may be made therein without departing from the spirit or scope of the invention. Reference should therefore be had to the appended claim in determining the scope of the invention.

What I claim is:

In apparatus for making metallic tubular bodies the combination of stock bending rolls and a roller conveyor extending parallel with said rolls and substantially therebelow, longitudinally extending supports positioned on either side of the plane interconnecting the pass through said rolls and said roller conveyor and being substantially parallel with said rolls and conveyor, guide surfaces associated with said supports and conveyor to guide the stock pieces as they issue from said pass circumferentially along substantially a circular path, and moving means on each of said supports to restrain expansion of the formed bodies and to propel said bodies longitudinally along said conveyor.

CLIFFORD S. SELTZER.

REFERENCES CITED

The following references are of record in the file of this patent:

UNITED STATES PATENTS

| Number | Name | Date |
|---|---|---|
| 1,911,961 | Melnick | May 30, 1933 |
| 813,559 | Koester | Feb. 27, 1906 |
| 2,236,747 | Cameron | Apr. 1, 1941 |
| 898,250 | Mitchell | Sept. 8, 1908 |
| 2,047,964 | Hothersall | July 21, 1936 |
| 2,038,305 | Mikaelson et al. | Apr. 21, 1936 |
| 2,206,801 | Aulbach | July 2, 1940 |
| 812,285 | McElroy | Feb. 13, 1906 |
| 2,038,305 | Mikaelson et al. | Apr. 21, 1936 |
| 1,935,391 | Cameron | Nov. 14, 1933 |